(12) United States Patent
Lavelle et al.

(10) Patent No.: US 6,570,495 B1
(45) Date of Patent: May 27, 2003

(54) VOICE CONFIRMATION SYSTEM AND METHOD FOR A VEHICLE

(75) Inventors: Patrick M. Lavelle, Sayville, NY (US); Thomas C. Malone, Miller Place, NY (US); James R. Tranchina, Dix Hills, NY (US)

(73) Assignee: Audiovox Corporation, Hauppauge, NY (US)

( * ) Notice: Subject to any disclaimer, the term of this patent is extended or adjusted under 35 U.S.C. 154(b) by 0 days.

(21) Appl. No.: 09/698,912

(22) Filed: Oct. 27, 2000

(51) Int. Cl.[7] ................................. B60Q 1/00
(52) U.S. Cl. .................. 340/425.5; 340/460; 340/692; 701/36
(58) Field of Search .................. 340/425.5, 460, 340/457, 439, 692; 701/36, 49, 93

(56) References Cited

U.S. PATENT DOCUMENTS

| | | | | |
|---|---|---|---|---|
| 4,426,691 A | * | 1/1984 | Kawasaki | 369/21 |
| 4,839,749 A | * | 6/1989 | Franklin | 360/12 |
| 5,451,926 A | * | 9/1995 | Li | 340/426 |
| 5,555,502 A | * | 9/1996 | Opel | 364/424.05 |
| 5,706,399 A | * | 1/1998 | Bareis | 704/274 |
| 5,717,387 A | * | 2/1998 | Suman et al. | 340/825.31 |
| 6,008,723 A | * | 12/1999 | Yassan | 340/438 |
| 6,131,060 A | * | 10/2000 | Obradovich et al. | 701/49 |
| 6,150,926 A | * | 11/2000 | Flick | 340/426 |

* cited by examiner

Primary Examiner—Benjamin C. Lee
Assistant Examiner—Phung Nguyen
(74) Attorney, Agent, or Firm—F. Chau & Associates, LLP (57) ABSTRACT

A method for providing voice confirmations corresponding to actions of passengers in a vehicle includes the step of detecting an action performed by an occupant of the vehicle. A corresponding voice confirmation is identified from among a plurality of pre-stored voice confirmations. The corresponding voice confirmation is audibly reproduced. The reproducing step may include the step of synthesizing the corresponding voice confirmation, or the step of playing back a pre-recorded voice confirmation as representative of the corresponding voice confirmation.

21 Claims, 8 Drawing Sheets

FIG. 8 ness of the driver attention. That# VOICE CONFIRMATION SYSTEM AND METHOD FOR A VEHICLE

TECHNICAL FIELD

The present invention relates generally to vehicles and, in particular, to a voice confirmation system and method for a vehicle. The system and method provide an acoustic confirmation of the execution and/or status of a command or inquiry initiated by a vehicle passenger.

BACKGROUND DESCRIPTION

As cars have been continuously updated to include new and useful features for the enjoyment and/or utility of a driver and his or her passengers, devices generally found in the home have made their way into cars as optional features. Such features include the television, the video cassette recorder (VCR), the compact disk (CD) player, and the digital video disk (DVD) player. While these features undoubtably provide enjoyment and/or utility to the driver and passengers of a vehicle, the features are nonetheless troublesome with respect to diverting driver attention. That is, upon initiating a command to a particular component or system, a user generally verifies that the command was received by visually inspecting a visual confirmation device. For example, upon actuating a button on a car radio to rewind an audio cassette tape contained therein, a user generally verifies that the button was indeed actuated by visually inspecting the display screen of the radio for the appearance of a rearward pointing arrow (i.e., ←) confirming the same. However, such actions performed to confirm the receipt, execution, and/or status of a user command and/or inquiry may divert the driver's attention from the road and cause an accident.

Accordingly, there is a need for a voice conformation system and method for a vehicle.

SUMMARY OF THE INVENTION

The problems stated above, as well as other related problems of the prior art, are solved by the present invention, a voice confirmation system and method for a vehicle.

According to a first aspect of the invention, a method for providing voice confirmations corresponding to actions of passengers in a vehicle includes the step of detecting an action performed by an occupant of the vehicle. A corresponding voice confirmation is identified from among a plurality of pre-stored voice confirmations. The corresponding voice confirmation is audibly reproduced.

According to a second aspect of the invention, the reproducing step includes the step of synthesizing the corresponding voice confirmation.

According to a third aspect of the invention, the reproducing step includes the step of playing back a pre-recorded voice confirmation as representative of the corresponding voice confirmation.

According to a fourth aspect of the invention, the detecting step includes the step of monitoring at least one existing vehicle system to identify indicia corresponding to a plurality of possible vehicle occupant actions.

According to a fifth aspect of the invention, the detecting step further includes the step of comparing the identified indicia to pre-stored indicia corresponding to the plurality of possible vehicle occupant actions.

According to a sixth aspect of the invention, the detecting step further includes the step of determining whether the identified indicia match any of the pre-stored indicia.

According to a seventh aspect of the invention, the identifying step includes the step of comparing the detected action to a plurality of actions pre-stored in a table.

According to an eighth aspect of the invention, the identifying step further includes the step of determining whether the detected action matches any of a plurality of possible vehicle occupant actions.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

It is to be understood that the present invention may be implemented in various forms of hardware, software, firmware, special purpose processors, or a combination thereof. Preferably, the present invention is implemented as a combination of both hardware and software, the software being an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device.

It is to be further understood that, because some of the constituent system components depicted in the accompanying Figures may be implemented in software, the actual connections between the system components may differ depending upon the manner in which the present invention is programmed. Given the teachings herein, one of ordinary skill in the related art will be able to contemplate these and similar implementations or configurations of the present invention.

To facilitate a clear understanding of the present invention, a brief description of the invention will now be given, followed by definitions of terms used herein. As noted above, the invention is directed to a voice confirmation system and method for a vehicle. The invention provides a voice confirmation of the receipt, execution, and/or status of a user command and/or inquiry. Such voice confirmation allows the driver to remain focused on the task of driving, as opposed to, for example, searching for a visual indication that his or her command and/or inquiry has been received and/or executed.

Figure 1:
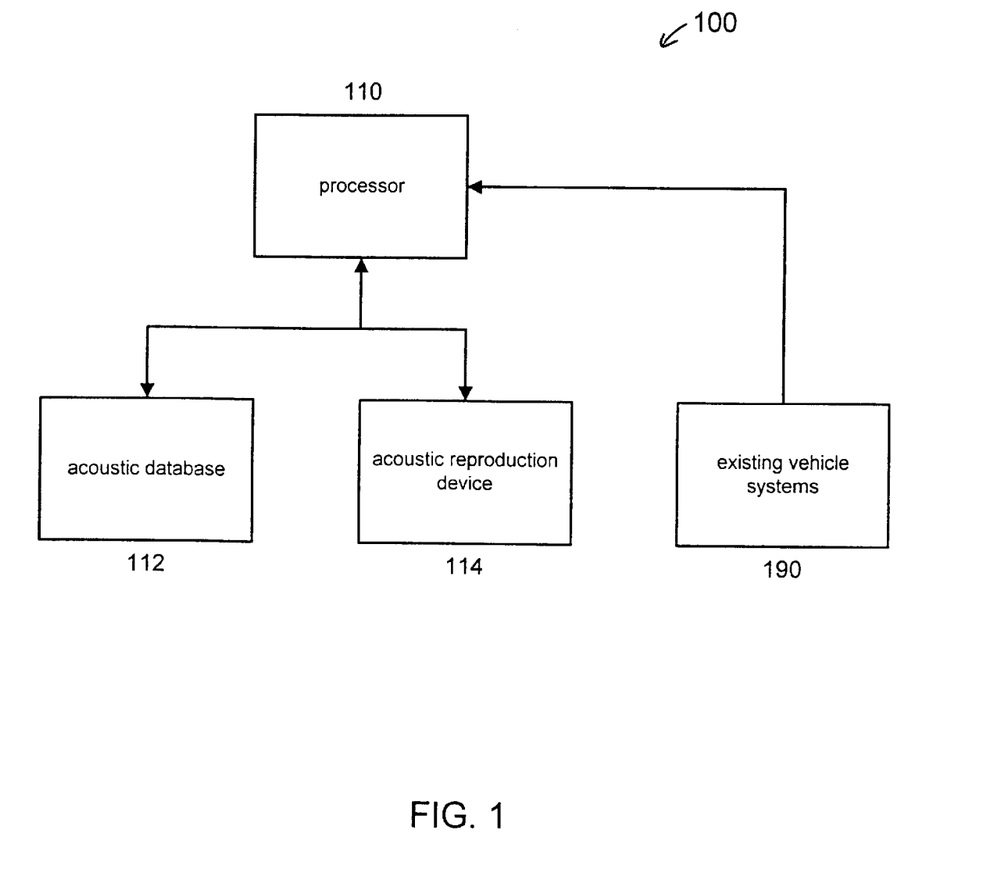
FIG. 1 is a block diagram illustrating the elements of a voice confirmation system 100 for a vehicle according to an illustrative embodiment of the invention.

FIG. 1 is a block diagram illustrating the elements of a voice confirmation system 100 for a vehicle according to an illustrative embodiment of the invention. The system 100 includes a processor 110 operatively coupled to an acoustic database 112, an acoustic reproduction device 114, and the vehicle (e.g., at least some of the existing vehicle systems 190).

The acoustic database 112 is adapted to store pre-recorded voice confirmations. The voice confirmations correspond to actions performed by the occupants of the vehicle such as, for example, initiating commands and/or inquiries.

The processor 110 is adapted to detect the receipt, execution, and/or completion of any vehicle occupant actions and identify corresponding voice confirmations from among the voice confirmations stored in the acoustic database 112.

The acoustic reproduction device 114 reproduces the voice confirmations identified by the processor 110. The acoustic reproduction device 114 may simply be a speaker(s) such as that included in an existing vehicle sound system. Of course, other arrangements are possible, including a dedicated speaker(s). In the latter case, the dedicated speaker(s) may be located proximate to, for example, one or more occupants (e.g., the driver), so as to inform the same without disturbing any other occupants (e.g., sleeping child in child seat in back of vehicle).

Figure 2:
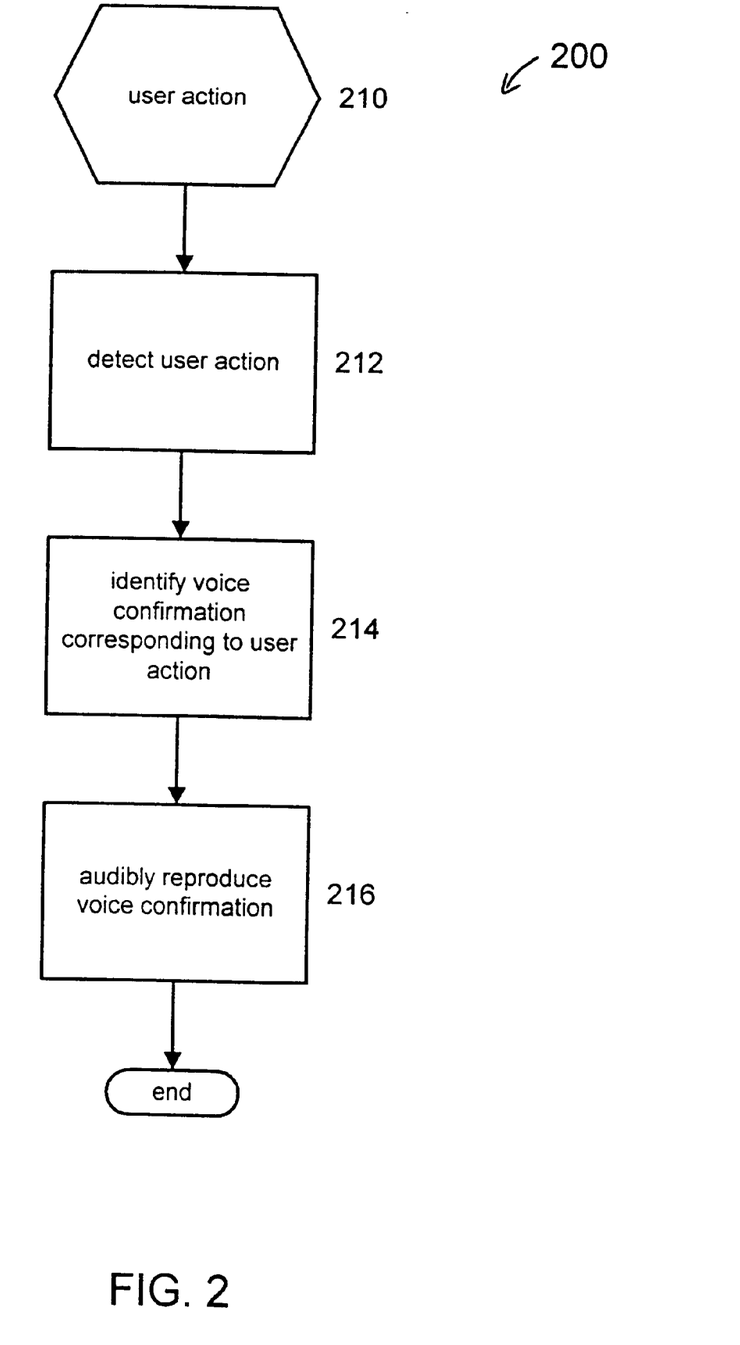
FIG. 2 is a flow diagram illustrating a method 200 for providing voice confirmations corresponding to actions performed by occupants of a vehicle, according to an illustrative embodiment of the invention.

FIG. 2 is a flow diagram illustrating a method 200 for providing voice confirmations corresponding to actions performed by occupants of a vehicle, according to an illustrative embodiment of the invention. A vehicle occupant performs an action (e.g., initiates a command and/or inquiry) (step 210). The action is detected by the processor 110 (step 212). A voice confirmation corresponding to the action is identified by the processor 110 from among the voice confirmations stored in the acoustic database 112 (step 214). The identified voice confirmation is then audibly reproduced for the occupant(s) by the acoustic reproduction device 114 (step 216).

Figure 3:
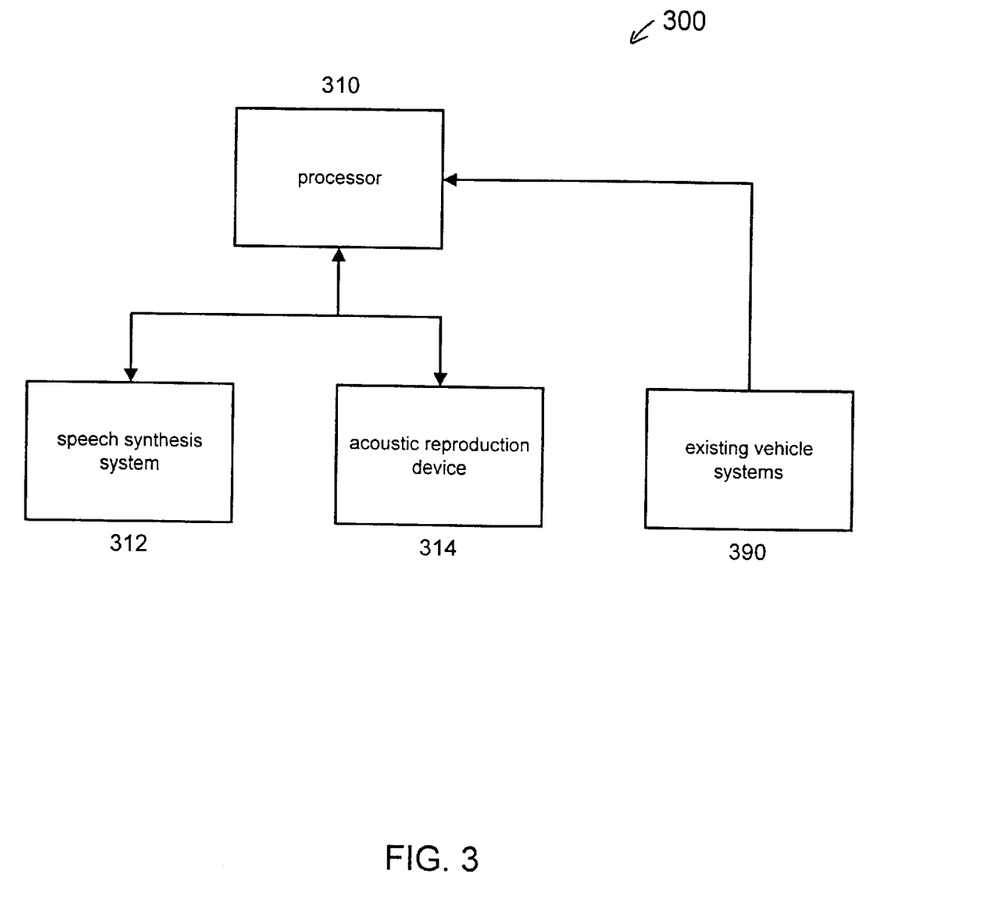
FIG. 3 is a block diagram illustrating the elements of a voice confirmation system 300 for a vehicle according to another illustrative embodiment of the invention.

FIG. 3 is a block diagram illustrating the elements of a voice confirmation system 300 for a vehicle according to another illustrative embodiment of the invention. The system 300 includes a processor 310 operatively coupled to a speech synthesis system 312, an acoustic reproduction device 314, and the vehicle (e.g., at least some of the existing vehicle systems 390).

The processor 310 is adapted to detect the receipt, execution, and/or completion of any vehicle occupant actions (e.g., initiating commands and/or inquiries) and identify corresponding voice confirmations from among a plurality of pre-stored voice confirmations. The identified voice confirmations are output to the speech synthesis system 312.

The speech synthesis system 312 is adapted to synthesize the voice confirmations output from the processor 310 and provide the synthesized voice confirmations to the acoustic reproduction device 314. The acoustic reproduction device 314 then reproduces the synthesized voice confirmation.

In a preferred embodiment of the invention, the acoustic reproduction device 314 is an existing speaker from, for example, the existing vehicle sound system. However, in other embodiments of the invention, the acoustic reproduction device may-be a dedicated speaker. Moreover, while shown as a separate component of system 300, it is to be appreciated that in other embodiments the acoustic reproduction device 314 may be part of the speech synthesis system 312. Given the teachings of the invention provided herein, one of ordinary skill in the related art will contemplate these and various other implementations of an acoustic reproduction device, while maintaining the spirit and scope of the invention.

Figure 4:
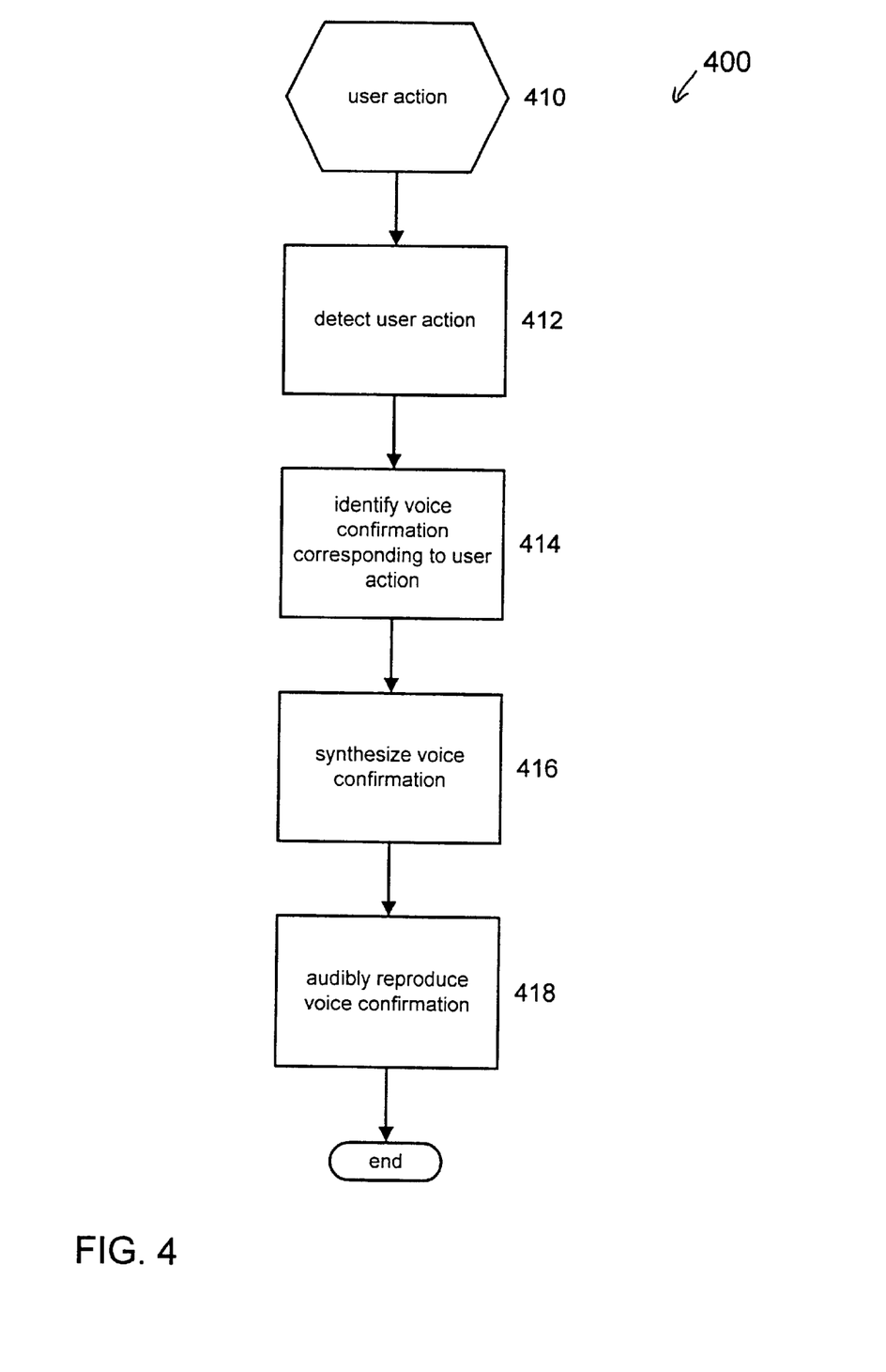
FIG. 4 is flow diagram illustrating a method 400 for providing a voice confirmation corresponding to actions performed by occupants of a vehicle, according to another illustrative embodiment of the invention.

FIG. 4 is flow diagram illustrating a method 400 for providing a voice confirmation corresponding to actions performed by occupants of a vehicle, according to another illustrative embodiment of the invention.

A vehicle occupant performs an action (step 410). The action is detected by the processor 310 (step 412). A voice confirmation corresponding to the action is identified by the processor 310 (step 414). The identified voice confirmation is then synthesized by the speech synthesis system 312 (step 416). The synthesized voice confirmation is then audibly reproduced for the occupant(s) by the acoustic reproduction device 314 (step 418).

A further detailed description of the processor (110, 310) will now be given according to an illustrative embodiment of the invention. With respect to detecting vehicle occupant actions, the processor accomplishes the same by maintaining a database of information corresponding to at least some of the possible actions that may be taken by a vehicle occupant and comparing the information in the database to actual data generated during an action. Such comparison may be made through the use of a look-up table(s). As is evident to one of ordinary skill in the related art, the preceding may be implemented in a variety of ways, all of which maintain the spirit and scope of the invention. For example, one such way is by interfacing with any existing vehicle systems. In particular, the invention may be coupled to an existing vehicle processor, transmission medium (e.g., wire), bus, or other element of a vehicle system. In the case when the invention is coupled to an existing vehicle processor, the receipt of a vehicle occupant input and/or a response thereto may be intercepted at the controlling device.

Figure 5:
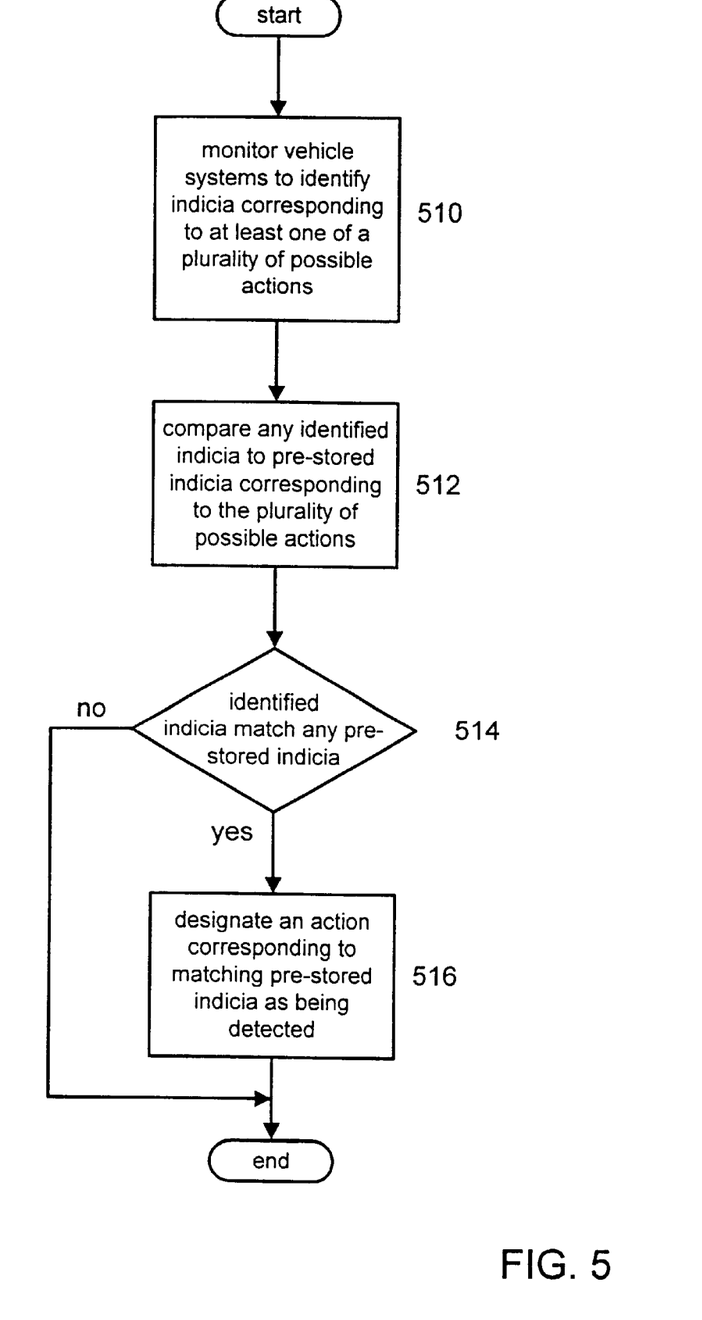
FIG. 5 is a flow diagram illustrating steps 212 and 412 of the methods of FIGS. 2 and 4, respectively, according to an illustrative embodiment of the invention.

FIG. 5 is a flow diagram illustrating steps 212 and 412 of the methods of FIGS. 2 and 4, respectively, according to an illustrative embodiment of the invention.

At least one existing vehicle system is monitored to identify indicia corresponding to at least one of a plurality of possible vehicle occupant actions (step 510). Any identified indicia are compared to pre-stored indicia associated with the plurality of possible vehicle occupant actions (step 512). It is then determined whether the identified indicia match any of the pre-stored indicia (step 514). If so, then a vehicle occupant action associated with the matching pre-stored indicia is designated as being detected (step 516). If not, then the method is terminated. It is to be appreciated that the association described above with respect to steps 512 and 516 may be made via a look-up table or other data structure, as is known to one of ordinary skill in the related art. Such a table would relate one or more pre-stored indicia to each possible vehicle occupant action.

With respect to identifying a corresponding voice confirmation, the processor accomplishes the same by employing, for example, a look-up table(s) which relates a given vehicle occupant action (that has been detected) to a corresponding voice confirmation. For example, in the event that the vehicle occupant has actuated the cruise control option, then such a look-up table may relate that action to a voice confirmation such as, for example, "cruise control on". Given the teachings of the present invention provided herein, one of ordinary skill in the related art will contemplate these and various other ways in which to identify voice confirmations, while maintaining the spirit and scope of the invention.

Figure 6:
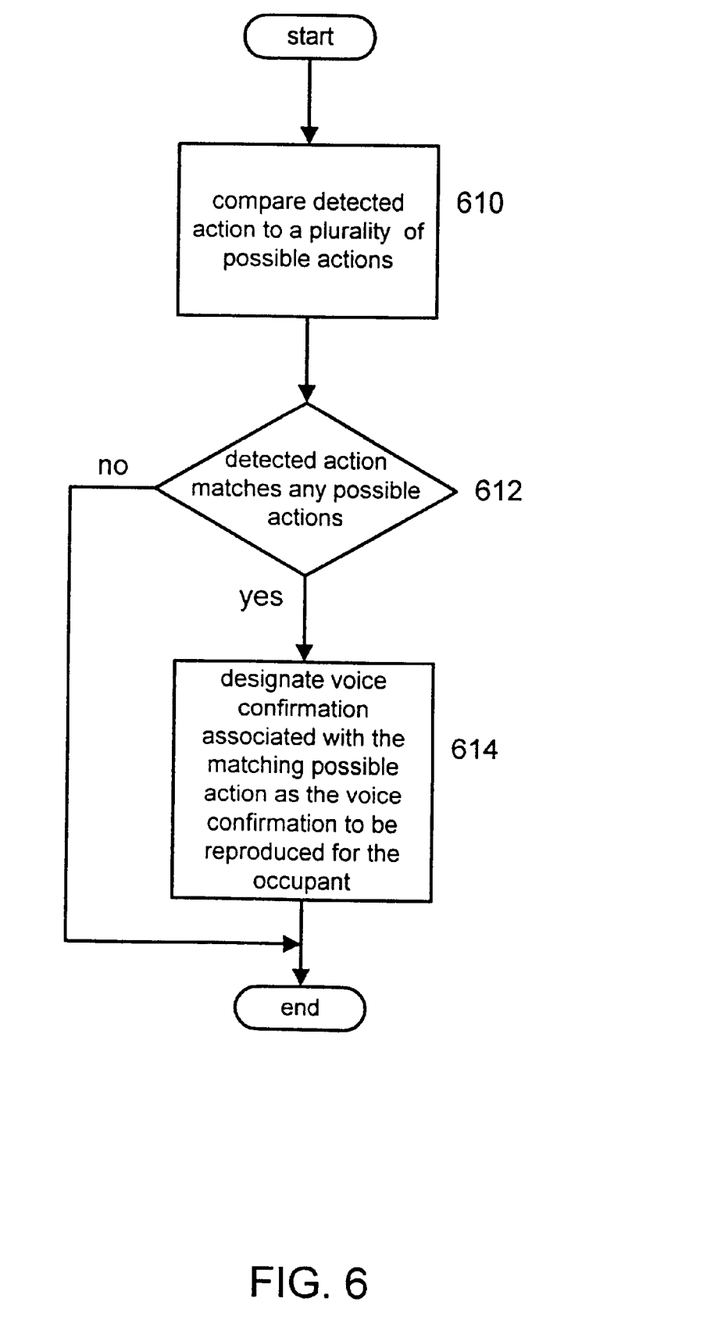
FIG. 6 is a flow diagram illustrating steps 214 and 414 of the methods of FIGS. 2 and 4, respectively, according to an illustrative embodiment of the invention.

FIG. 6 is a flow diagram illustrating steps 214 and 414 of the methods of FIGS. 2 and 4, respectively, according to an illustrative embodiment of the invention.

The detected action is compared to a plurality of possible vehicle occupant actions (step 610). It is then determined whether the detected action matches any of the possible vehicle occupant actions (step 612). If so, then the voice confirmation associated with the matching possible vehicle occupant action is designated as the corresponding voice confirmation to be reproduced for the occupant (step 614). If not, then the method is terminated. It is to be appreciated that the association described above with respect to step 614 may be made via a look-up table or other data structure, as is known to one of ordinary skill in the related art.

It is to be appreciated that the processor (110, 310) may be implemented as a distinct processor, separate from any existing vehicle processors. Alternatively, the processor (110, 310) may be implemented in any one of the existing vehicle processors. Given the teachings of the invention provided herein, one of ordinary skill in the related art will contemplate these and various other implementations of the elements of the invention, while maintaining the spirit and scope thereof.

Figure 7:
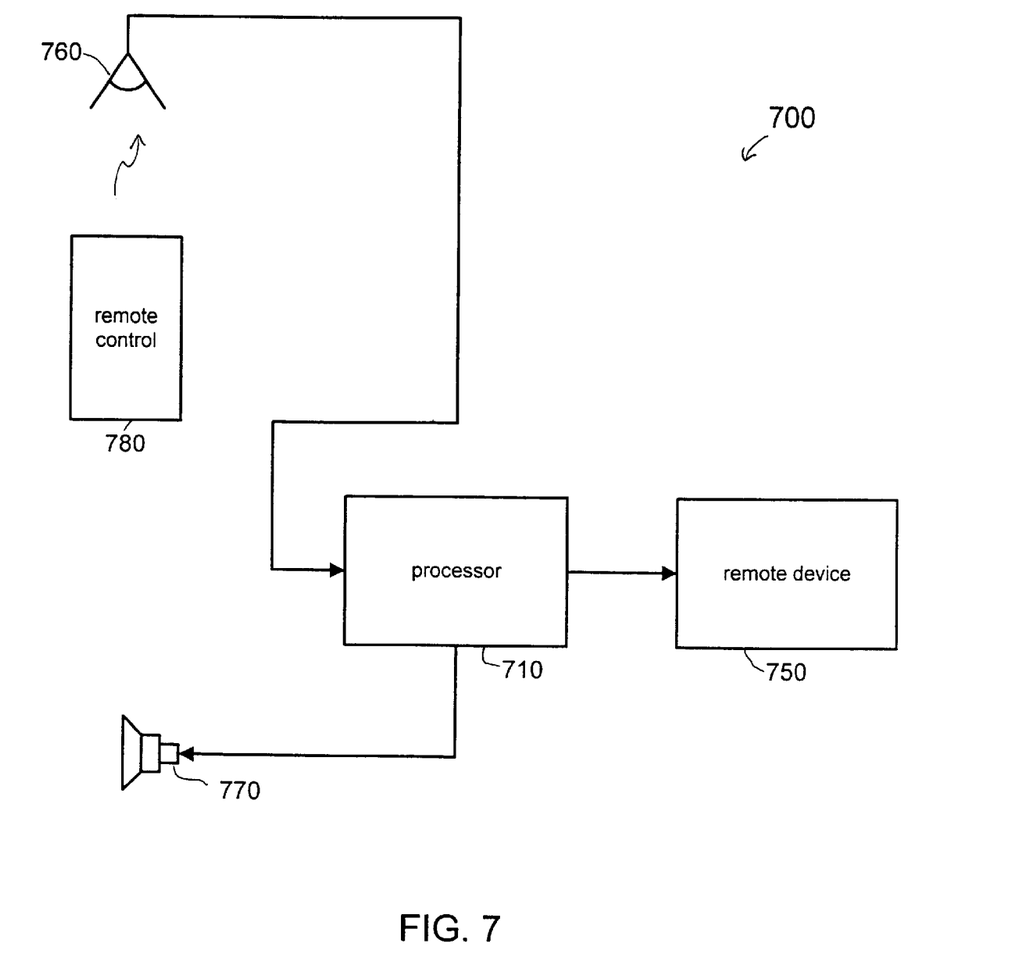
FIG. 7 is a block diagram illustrating the elements of a voice confirmation system 700 for a vehicle according to yet another illustrative embodiment of the invention.

FIG. 7 is a block diagram illustrating the elements of a voice confirmation system 700 for, a vehicle according to yet another illustrative embodiment of the invention. The system 700 includes a processor 710 operatively coupled to at least one remote device 750, a remote eye 760, and a speaker 770 (e.g., a cabin mounted speaker). The remote eye 760 receives wireless signals from a remote control device 780. The wireless signals may be infrared or radio frequency (RF) signals. The at least one remote device 750 may include, for example, a TV tuner, a video cassette player (VCP), a digital video disk (DVD) player, a compact disk (CD) player, an amplitude modulation/frequency modulation (AM/FM) radio, and so forth. The at least one remote device 750 may also include typical vehicle systems (e.g., air conditioning, cruise control, lighting (e.g., headlights, high-beams, fog-lights)) and/or portions thereof.

A vehicle passenger may use the remote control device 780 to send a wireless control signal to the remote eye 760 to control the at least one remote device 750. The wireless control signal is then provided to (routed through) the processor 710 for interpretation and selection of an appropriate voice confirmation, which is then output to the speaker 770. The preceding actions correspond to steps 210 through 216 of FIG. 2 above. In other embodiments of the invention, the system of FIG. 7 may include a speech synthesis system such as speech synthesis system 312. In such a case, step 416 of FIG. 4 would be performed by the speech synthesis system. Given the teachings of the present invention provided herein, one of ordinary skill in the related art will contemplate these and various other configurations of the elements of the invention, while maintaining the spirit and scope thereof.

Figure 8:
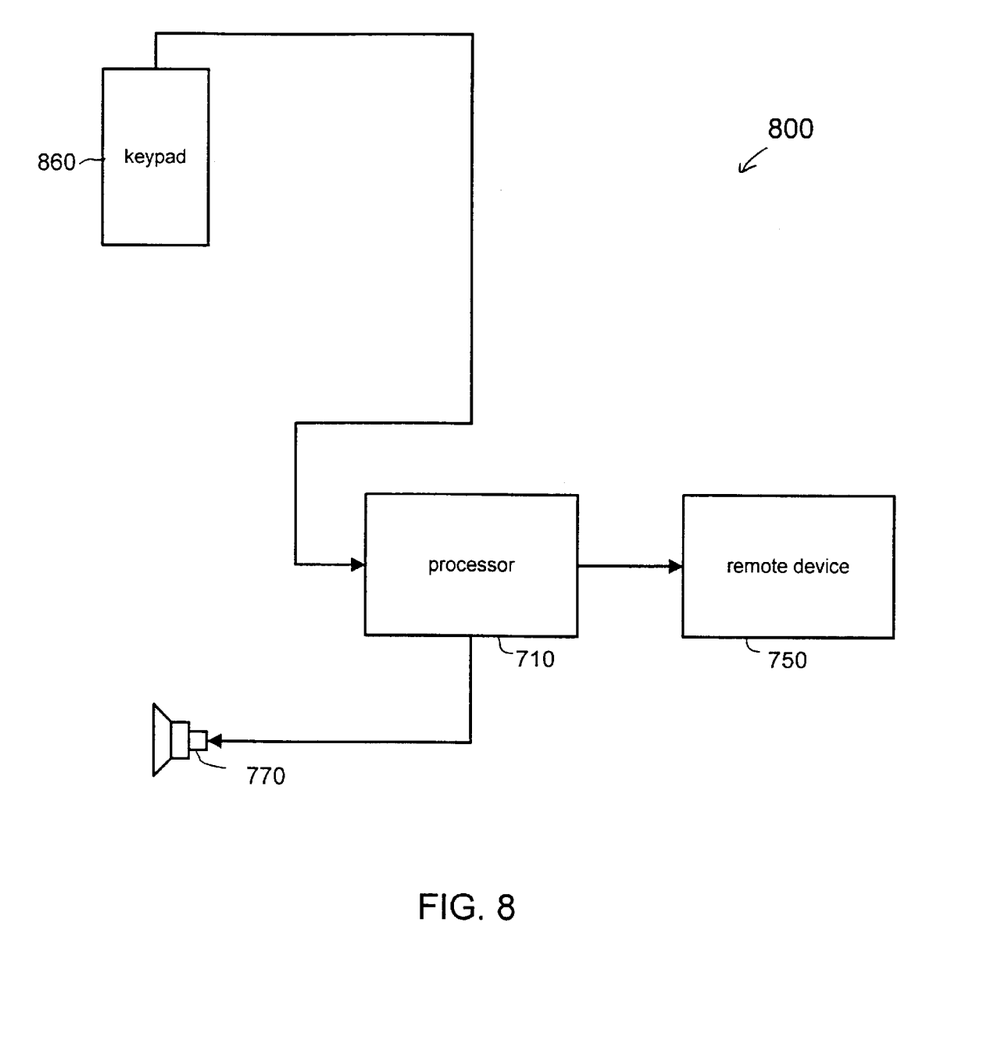
FIG. 8 is a block diagram illustrating the elements of a voice confirmation system 800 for a vehicle according to still another illustrative embodiment of the invention.

FIG. 8 is a block diagram illustrating the elements of a voice confirmation system 800 for a vehicle according to still another illustrative embodiment of the invention. The system 800 includes a processor 710 operatively coupled to at least one remote device 750, a keypad 860, and a speaker 770 (e.g., a cabin mounted speaker).

A vehicle passenger may use the keypad 860 to send a control signal to the at least one remote device 750 to control the same. The control signal is routed through the processor 710 for interpretation and selection of an appropriate voice confirmation, which is then output to the speaker 770. The preceding actions correspond to steps 210 through 216 of FIG. 2 above. In other embodiments of the invention, the system of FIG. 8 may include a speech synthesis system such as speech synthesis system 312. In such a case, step 416 of FIG. 4 would be performed by the speech synthesis system. It is to be appreciated that a special purpose may be employed to implement the processors 710, 810; alternatively, an existing vehicle processor may be employed. Given the teachings of the present invention provided herein, one of ordinary skill in the related art will contemplate these and various other configurations of the elements of the invention, while maintaining the spirit and scope thereof.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for providing voice confirmations corresponding to actions of passengers in a vehicle, comprising the steps of:

detecting an action by an occupant of the vehicle by monitoring at least one existing vehicle system to detect an indicia representing data generated by the at least one existing vehicle system during the action, the action being a user command to control the at least one existing vehicle system by contact or remote control;

identifying a corresponding voice confirmation that corresponds to a particular detected action from among a plurality of pre-stored voice confirmations, wherein the at least one existing vehicle system comprises at least one of an audio or visual entertainment system, environmental control system, or cruise control; and audibly reproducing the corresponding voice confirmation.

2. The method according to claim 1, wherein said reproducing step comprises the step of synthesizing the corresponding voice confirmation.

3. The method according to claim 1, wherein said reproducing step comprises the step of playing back a prerecorded voice confirmation as representative of the corresponding voice confirmation.

4. The method according to claim 1, wherein said detecting step further comprises the step of comparing the detected indicia to pre-stored indicia corresponding to the plurality of possible vehicle occupant actions.

5. The method according to claim 4, wherein said detecting step further comprises the step of determining whether the detected indicia match any of the pre-stored indicia.

6. The method according to claim 1, wherein said identifying step comprises the step of comparing the detected action to a plurality of actions pre-stored in a table.

7. The method according to claim 6, wherein said identifying step further comprises the step of determining whether the detected action matches any of a plurality of possible vehicle occupant actions.

8. A system for providing voice confirmations corresponding to actions of passengers in a vehicle, comprising:

a processor adapted to detect an action to control at least one existing vehicle system by contact or remote control, performed by an occupant of the vehicle, by monitoring the at least one existing vehicle system to detect an indicia representing data generated by the at least one existing vehicle system during the action;

a processor further able to identify a corresponding voice confirmation that corresponds to a particular detected action from among a plurality of pre-stored voice confirmations, the action being one of a user command to control at least one existing vehicle system by contact or remote control, or user inquiry, wherein the at least one existing vehicle system comprises at least one of an audio or visual entertainment system, environmental control system, or cruise control; and an acoustic reproduction device adapted to audibly reproduce the corresponding voice confirmation.

9. The system according to claim 8, further comprising a speech synthesis system adapted to synthesize the corresponding voice confirmation.

10. The system according to claim 8, further comprising an acoustic database adapted to store a plurality of pre-recorded voice confirmations, and wherein said acoustic reproduction device is further adapted to playback one of the plurality of pre-recorded voice confirmations as representative of the corresponding voice confirmation.

11. The system according to claim 8, wherein said processor is further adapted to compare the detected indicia to pre-stored indicia corresponding to the plurality of possible vehicle occupant actions.

12. The system according to claim 11, wherein said processor is further adapted to determine whether the detected indicia match any of the pre-stored indicia.

13. The system according to claim 8, wherein said processor is further adapted to compare the detected action to a plurality of actions pre-stored in a table.

14. The system according to claim 13, wherein said processor is further adapted to determine whether the detected action matches any of a plurality of possible vehicle occupant actions.

15. The system according to claim 8, further comprising:

a remote control adapted to output a control signal corresponding to the action performed by the occupant of the vehicle; and a remote eye operatively coupled to said processor, adapted to receive the control signal, and wherein said processor is further adapted to detect the action based upon the control signal.

16. The system according to claim 8, further comprising a keypad operatively coupled to said processor, adapted to output a control signal corresponding to the action performed by the occupant of the vehicle, and wherein said processor is further adapted to detect the action based upon the control signal.

17. A program storage device readable by machine, tangibly embodying a program of instructions executable by the machine to perform method steps for providing voice confirmations corresponding to actions of passengers in a vehicle, said method steps comprising:

detecting an action to control at least one existing vehicle system by a contact or remote control, performed by an occupant of the vehicle, by monitoring the at least one existing vehicle system to detect an indicia representing data generated by the at least one existing vehicle system during the action, the action being one of a user command or a user inquiry;

identifying a corresponding voice confirmation that corresponds to a particular detected action from among a plurality of pre-stored voice confirmations, wherein the at least one existing vehicle system comprises at least one of an audio or visual entertainment system, environmental control system, or cruise control; and audibly reproducing the corresponding voice confirmation wherein reproduction comprises the step of synthesizing the corresponding voice confirmation.

18. The program storage device according to claim 17, wherein said reproducing step comprises the step of playing back a pre-recorded voice confirmation as representative of the corresponding voice confirmation.

19. The method according to claim 1, wherein the corresponding voice confirmation corresponds to a receipt of one of the user command and the user inquiry.

20. The method according to claim 1, wherein the corresponding voice confirmation corresponds to an execution of one of the user command and the user inquiry.

21. The method according to claim 1, wherein the corresponding voice confirmation corresponds to a status of one of the user command and the user inquiry.

* * * * *